Oct. 28, 1941.   E. E. LYNCH   2,260,838
TIMING DEVICE
Filed Nov. 30, 1939
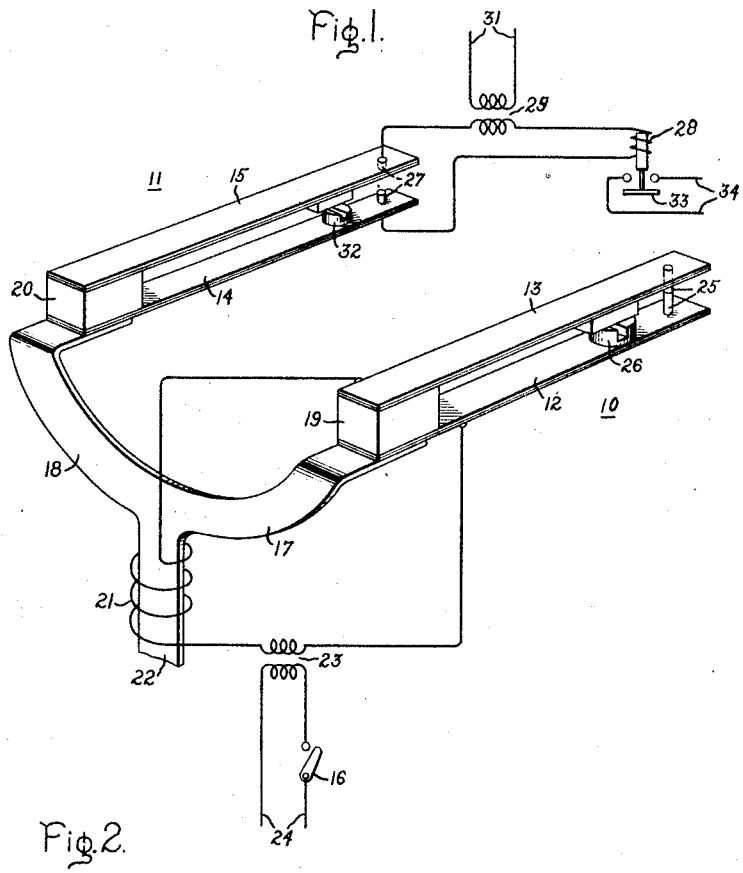
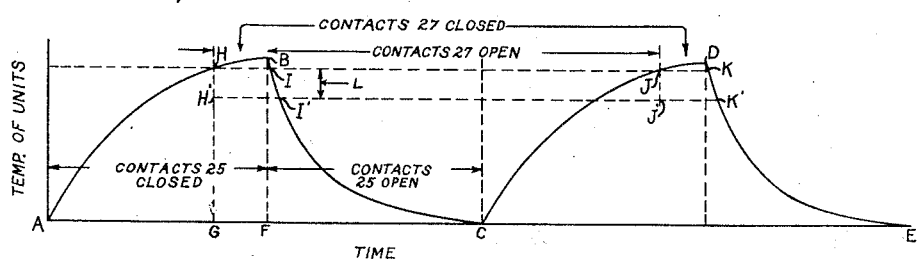
Inventor:
Edward E. Lynch,
by Harry E. Dunham
His Attorney.

Patented Oct. 28, 1941

2,260,838

UNITED STATES PATENT OFFICE 2,260,838

TIMING DEVICE

Edward E. Lynch, East Hampton, Mass., assignor to General Electric Company, a corporation of New York Application November 30, 1939, Serial No. 306,919

13 Claims. (Cl. 200—122)

This invention relates to timing devices and more particularly to such devices adapted for controlling the operation of a machine or other apparatus which is to be periodically energized.

In certain instances it is desired to operate a machine at intervals for a relatively brief period followed by a relatively long period during which the machine is at rest. For example, in the case of a coal stoker for a domestic heating furnace, the coal feed and blower motor is usually controlled by an enclosure thermostat. During mild weather conditions, however, the thermostat may not effect the energization of the motor often enough to maintain the fire in the furnace. To prevent the fire from dying out, it is desirable to supplement the normal enclosure thermostat control with a suitable timing means whereby the motor will be periodically energized, for example, for approximately five minutes during every half-hour period. Such timing means need not be accurate to a high degree but simplicity and low cost are prime considerations.

It is an object of this invention to provide a new and improved timing device comprising relatively few parts, which are of simple construction and may be manufactured at low cost.

It is a further object of this invention to provide a new and improved timing device for periodically energizing an electrical circuit for a predetermined relatively short period between relatively long periods of deenergization.

It is a still further object of this invention to provide a timing device embodying a pair of relatively simple condition responsive units, and a conditioning means therefor which means are so controlled by one of said units as to cause actuation of the second of said units with a predetermined periodicity of relatively long cycles.

In accordance with the illustrated embodiment of the invention, two temperature responsive units having suitable time response characteristics are arranged in a thermal relation with an electric heater, the heater being controlled through contacts associated with one of the units so that it is energized for a predetermined period and is also deenergized for a predetermined period which may be the equivalent of the energized period. The second of the units under the influence of the heater is so arranged and adjusted that it will close its contacts for a relatively short period of time during the energized condition of the heater for correspondingly controlling an external load circuit.

For a consideration of what I believe to be novel and my invention, attention is directed to the following description and the claims appended thereto taken in connection with the accompanying drawing in which Fig. 1 is a view in perspective of a timing device representing one embodiment of my invention; and Fig. 2 is a curve illustrating certain operating characteristics of the device illustrated in Fig. 1.

Referring to the drawing, two condition responsive units 10 and 11 are provided which in this instance comprise cooperating pairs of temperature responsive or bimetallic blades 12, 13, and 14, 15, respectively. The units 10 and 11 are supported upon arms 17 and 18, respectively, of a bracket of heat conducting material, the blades 12 and 14 of the units 10 and 11 being arranged in a thermal conducting relationship with the corresponding bracket arms. Heat insulators 19 and 20 separate the fixed ends of the pairs of blades of the two units. An electric heating coil 21 is arranged in thermal communication with a depending portion 22 of the bracket which heater is adapted to be energized through a transformer 23 from a suitable source of supply by leads 24. A suitable switch 16 is provided in one of the leads by which the operation of the device may be controlled. The energization of the heater is controlled by the unit 10 through contacts 25, a suitable permanent magnet 26 being provided on one of the blades for effecting a snap action of the contacts. The contacts 27 of the unit 11 are adapted for controlling an energizing circuit for a relay 28 through the secondary winding of transformer 29, the primary winding thereof being connected to a suitable source of supply through leads 31. A relatively small permanent magnet 32 may be provided on one of the blades of unit 11 for effecting a snap action for the contacts 27. The relay 28 is provided with a contact arm 33 for controlling a suitable load circuit including leads 34.

The pairs of blades 12, 13, and 14, 15 are so arranged with respect to each other that the free ends thereof flex similarly with variations in ambient temperature. The units being thus self-compensating for ambient temperature conditions, the time characteristics of the units may be determined by the amount of heat transmitted to the lower blades 12 and 14 of the two units through the bracket arms 17 and 18. The blades 12 and 13 of the first unit 10 are normally in the contact making position, as indicated, so that when switch 16 is initially closed the heater 21 will be energized. Upon a predetermined amount of heat being transmitted to the lower blade 12 through the arm 17, the blade 12 will be stressed downwardly until the force overcomes that of the permanent magnet 26 whereupon contacts 25 will be separated and the heater deenergized. After a predetermined time, the thermostat blade 12 will cool off and bend upwardly to effect the reclosure of the contacts 16 and the reenergization of the heater 21. The time constants for the unit 10, the size of the heater, and the thermal conductivity and thermal capacity of the bracket and the thermal insulation of the heated system are so selected that the heater 21 is energized and deenergized for substantially similar and relatively long periods of time, such as of the order of 15 minutes each. The thermostat blades 14 and 15 of the unit 10 are so arranged that the contacts 27 are normally in the open circuit position. Upon a predetermined amount of heat being transmitted to the lower blade 14 through the bracket arm 18, the free end thereof will be deflected upwardly so as to effect the engagement of the contacts 27 and the closure of the load circuit. The amount of heat required for effecting the closure of the contacts 27 may be determined by the selection, or by adjustment of the blades 14 and 15. The rate of heat conduction to the blade 14 may be determined by the proper dimensioning and insulating of the bracket arm 18 so that the desired operating characteristics of the unit 11 relative to the operating cycle of unit 10 may be obtained.

Referring to Fig. 2, the operation of the timing device may be more clearly understood. The curve in this figure represents the operating characteristic of the unit blades 12 and 14 with the temperature of the blades plotted as ordinates and time plotted as abscissae. The device is thrown into operation by closing switch 16. At this point, indicated at A on the curve, the contacts 25 are closed completing the circuit for the heater 21. Heat will gradually be conducted from the portion 22 through the bracket arm 17 to the blade 12 which will be gradually stressed according to the curve portion A—B. After a predetermined length of time A—F, sufficient energy will be stored in the blade 12 so as to cause the blade 12 to separate from blade 13 against the force of the permanent magnet 26 and break the contacts 25. The heater being thereupon deenergized, the blade 12 will cool off with a characteristic indicated by the curve portion B—C. After a further length of time F—C, the contacts 25 will close again to reenergize the heater 21 and the cycle will be repeated as represented by the curve C—D—E. The unit 11 is so designed that its contacts 27 will close upon the temperature of the blade 14 reaching a value corresponding to H on the curve, which will occur at the end of the time A—G. Since the heater will be deenergized at the end of time A—F, blade 14 will thereupon commence to cool off simultaneously with blade 12 of the unit 10. The permanent magnet 32 being relatively small, the contacts 27 will reopen upon the blade temperature falling below H at some point on the curve as indicated at I. The contacts 27 will not be reclosed again until the heat peak of the next succeeding operating cycle of the unit 10, as during the period J—K indicated on the curve C—D—E.

Depending upon the strength of the permanent magnet 32, there may be a differential temperature L between the closing and the opening of contacts 27, in which case the contacts may open at some temperature less than I and K such as I' and K'. Because the cooling curves B—C and D—E are relatively steep in this region the period during which the contacts 27 are closed is but slightly increased, H'—I' and J'—K' being slightly greater than H—I and J—K, respectively.

Assume now, for example, that the operating cycle A—B—C for the unit 10 extends over a period of approximately 30 minutes, that is, that the contacts 25 are closed for 15 minutes and open for 15 minutes. The period of time H—I that the contacts 27 are closed is approximately five minutes, and they will be opened over the remainder of the operating cycle of the unit 10, or for 25 minutes. It is understood, of course, that these time values may be varied as desired by selecting the proper constants for the various elements of the device, including the units, the heater, and the heat conducting bracket.

With this device the load circuit 34 may be periodically controlled and in the case of a furnace stoker, as during idling conditions, may be operated for a five-minute period and then be maintained shut down for a 25-minute period thereafter.

Having described the principle of operation of my invention together with the apparatus which I now consider to represent the best embodiment thereof, I desire to have it understood that the arrangement shown is merely illustrative and that the invention may be carried out by other means.

What I claim as new and desire to secure by Letters Patent of the United States is:

1. A timing device comprising first and second pairs of cooperating bimetallic blades, the blades of each pair being so arranged as to maintain substantially constant relative positions with changes in ambient temperature, each pair of blades having cooperating electrical contacts, a heat conducting support for said pairs of blades, a heater thermally associated with said support and adapted to be controlled by the contacts of said first pair of blades, a first blade of each of said pairs being secured in a heat conductive relationship to said support, said first blade of said first pair being normally in contact making position with respect to its cooperating blade and adapted to be moved to a contact breaking position upon a predetermined amount of heat being conducted thereto from said support, said first blade of said second pair being normally in the open contact position with respect to its cooperating blade and adapted to move to the contact making position upon an amount of heat slightly less than said predetermined amount being conducted thereto through said support.

2. A timing means comprising first and second pairs of bimetallic thermal responsive elements, said elements of each pair being so arranged relative to each other as to be deflected similarly in accordance with ambient temperature conditions, the elements of each pair having cooperating electrical contacts, a heat conducting support for said pairs of elements, an electric heater for said support adapted to be controlled by the contacts of the first of said pair of elements, the first element of each of said pairs being secured in a heat conductive relationship to said support, said first element of said first pair being normally in contact making position and adapted to be moved to a contact breaking position upon a predetermined amount of heat being conducted thereto from said support for deenergizing said heater, said first element of said second pair being normally in open contact position and adapted for moving to contact making position upon an amount of heat slightly less than said predetermined amount being conducted thereto through said support.

3. A timer comprising the combination of a first and a second temperature responsive unit, said units being so arranged as to be self-compensating for variations in ambient temperature conditions, each of said units having cooperating electrical contacts, a heat conductive support for said two units, an electrical heater arranged in thermal relationship with said support, a circuit for said heater adapted for control by the contacts of one of said units, the contacts of said one unit being normally closed and adapted to be actuated to the open circuit position upon a predetermined amount of heat being conducted thereto through said support, the contacts of the other of said units being normally open and adapted to be closed due to heat conducted thereto through said support during a predetermined relatively short period of time during the operating cycle of said first unit.

4. A timer comprising a pair of temperature responsive units including ambient temperature compensating means, cooperating electrical contacts associated with each of said units, heating means for said units for causing the actuation of said contacts, and an electrical circuit including the contacts of one of said units for automatically controlling said heating means.

5. A timer comprising a pair of temperature responsive units, a heating means for said units, contacts associated with each of said units, a control means including the contacts of one of said units for said heating means whereby said heating means is energized for a predetermined period and deenergized for a similar predetermined period, the contacts of said second unit being adapted to be conditioned only for a predetermined period during the energized condition of said heating means.

6. In a timing device the combination comprising a pair of temperature responsive units, each of said units having cooperating contacts, means for heating said two units for causing the actuation of said contacts, control means including one of said units for said heating means whereby said heating means is energized for a predetermined period of time and deenergized for a similar period, the other of said units being so arranged that its contacts are actuated and held in the closed position only during a predetermined portion of the period during which said heating means is energized.

7. In a timing device the combination comprising a pair of temperature responsive units each having cooperating electrical contacts, an electrical heater for relatively slowly heating said two units for effecting the actuation of said units and said contacts, a control circuit for said heater including the contacts of one of said units whereby said heater is alternately energized and deenergized, the other of said units being so adjusted that its contacts are actuated to the closed position only during a predetermined portion of the period that said heater is energized.

8. In a timing device, a pair of condition responsive units having electrical contacts, conditioning means for causing the actuation of said units, control means for said conditioning means including one of said units whereby said conditioning means is alternately energized and deenergized, the contacts of the second of said units being adapted to be actuated and held in a predetermined position only during a predetermined portion of the operating cycle of said conditioning means.

9. In a timing device, temperature responsive means, a heating means for said temperature responsive means, contacts associated with said temperature responsive means for alternately energizing and deenergizing said heating means, and control contacts actuable by said temperature responsive means in accordance with a predetermined condition of said heating means.

10. In a timing device, temperature responsive means, a heating means for said temperature responsive means, contacts associated with said temperature responsive means for automatically effecting the alternate energization and deenergization of said heating means, and control contacts for an external load circuit actuable by said temperature responsive means during a predetermined extreme condition of said heating means in each cycle of operation thereof.

11. A timer comprising a condition responsive device, a conditioning means for said device, contacts associated with said device for alternately energizing and deenergizing said conditioning means, and control contacts for an external load circuit actuable to a predetermined position by said device in response to a predetermined peak condition of operation of said conditioning means during each operating cycle thereof.

12. In a thermal timing device, the combination of heating means, a pair of thermal responsive elements heated thereby through a relatively wide temperature range, heating control means operated by one of said elements for energizing and deenergizing said heater at the opposite limits of said wide temperature range, and timing control means operated by the other of said elements at the limits of a relatively narrow temperature range within said wide temperature range.

13. A timing device comprising first and second temperature responsive elements, a pair of contacts controlled by said first element, a pair of contacts controlled by said second element, electric heating means arranged to supply heat to both of said temperature responsive elements to effect actuation of said contacts, means controlled by the contacts associated with the first of said temperature responsive elements for energizing said heating means whereby said heating means is periodically energized and deenergized and its temperature cyclically varies between maximum and minimum values, the contacts associated with the second of said temperature responsive elements being adjusted to open and close at temperatures above the minimum temperature attained by said heating means.

EDWARD E. LYNCH.